US008005787B2

(12) United States Patent
Schuchardt

(10) Patent No.: US 8,005,787 B2

(45) Date of Patent: Aug. 23, 2011

(54) DATA REPLICATION METHOD

(75) Inventor: Bruce J. Schuchardt, Newberg, OR (US)

(73) Assignee: VMware, Inc., Palo Alto, CA (US)

(*) Notice: Subject to any disclaimer, the term of this patent is extended or adjusted under 35 U.S.C. 154(b) by 694 days.

(21) Appl. No.: 11/982,563

(22) Filed: Nov. 2, 2007

(65) Prior Publication Data

US 2009/0119347 A1 May 7, 2009

(51) Int. Cl.
*G06F 7/00* (2006.01)
*G06F 17/00* (2006.01)

(52) U.S. Cl. ......... 707/615; 707/616; 707/619; 707/633

(58) Field of Classification Search ........... 707/999.203, 707/999.204, 615, 616, 619, 626, 633, 634, 707/635, 637, 638, 639
See application file for complete search history.

(56) References Cited

U.S. PATENT DOCUMENTS 5,978,933 A * 11/1999 Wyld et al. ...................... 714/13
6,012,059 A * 1/2000 Neimat et al. ......... 707/999.008
6,122,630 A * 9/2000 Strickler et al. ....... 707/999.008
6,247,025 B1 6/2001 Bacon
6,324,495 B1 * 11/2001 Steinman ........................ 703/17
6,438,558 B1 * 8/2002 Stegelmann .................. 707/615
6,449,734 B1 * 9/2002 Shrivastava et al. ............ 714/15
6,681,226 B2 1/2004 Bretl et al.
6,738,977 B1 5/2004 Berry et al.
6,829,769 B2 12/2004 Cranston et al.
7,017,160 B2 3/2006 Martin et al.
7,131,120 B2 10/2006 Veselov
7,143,392 B2 11/2006 Li et al.
7,152,231 B1 12/2006 Galluscio et al.
7,171,663 B2 1/2007 Moore et al.
7,177,866 B2 * 2/2007 Holenstein et al. ........... 707/615
7,188,145 B2 3/2007 Lowery et al.
7,610,319 B1 * 10/2009 Kekre et al. ............ 707/999.204
2001/0014905 A1 8/2001 Onodera
2002/0194015 A1 * 12/2002 Gordon et al. .................... 705/1
2003/0097360 A1 5/2003 McGuire et al.
2004/0025171 A1 2/2004 Barinov et al.
2004/0078637 A1 * 4/2004 Fellin et al. ....................... 714/6
2004/0133591 A1 * 7/2004 Holenstein et al. ........... 707/102
2004/0199828 A1 10/2004 Cabezas et al.
2005/0086656 A1 4/2005 Whitlock et al.
2006/0230082 A1 * 10/2006 Jasrasaria ..................... 707/204

OTHER PUBLICATIONS

Kim Haase, "Java™ Message Service API Tutorial"; 2002; Sun Microsystems, Inc., 278 pages.
Jon Meyer & Troy Downing, "Java Virtual Machine" users manual, 1997 O'Reilly & Associates, First Edition, California, USA.
Barry Burd, "Java 2 for Dummies," user's manual, 2001 Hungry Minds, Inc., New York USA.
Jamie Jaworski, "Java 1.1 Developer's Guide," Second Edition, Sams.net Publishing, 1997; pp. 3-10, 17-20, 90-92, 372-383, and 983-990.
Graham Glass, "Web Services Building Blocks for Distributed Systems," Prentice Hall PTR, 2002; pp. 55-70.
Silberschatz, et al, "Applied Operating System Concepts," First Edition, John Wiley & Sons, Inc., 2000; pp. 61-64, 74-77, 87-114, 507-518.

(Continued)

*Primary Examiner* — Robert Stevens
*Assistant Examiner* — Phong Nguyen

(57) ABSTRACT

To ensure data consistency for a new data replica created for a computing system, the transmission and receipt of messages altering the data are monitored and replication of the data is permitted when all changes to the data that have been transmitted to the data have been received.

11 Claims, 3 Drawing Sheets

PROCESS A
32
DATA REGION N
DATA REGION 2
DATA REGION 1
MESSAGES RECEIVED
Channel 4
Channel 3
Channel 2
Channel 1
56
42
44
46
48
50
52
20
40
PROCESS E
MESSAGES TRANSMITTED
Channel 1
Channel 2
Channel 3
Channel 4
54
PROCESS B
34
PROCESS C
36
PROCESS D
38

OTHER PUBLICATIONS

K. Mani Chandy & Leslie Lamport, "Distributed Snapshots: Determining global States of Distributed Systems," ACM Transactions on computer Systems, vol. 3, No. 1, Feb. 1985, pp. 63-75.

Carl W. Olofson & John Humphreys, "White Paper: Overcoming the Data Bottleneck to Deliver Dynamic IT: GemStone's GemFire with IBM's BladeCenter," Publication of IDC Information and Data, Copyright 2005 IDC.

"Performance, Availability and Real-time Intelligence for Online Portals—Achieving this triple convergence with the GemFire Enterprise Data Fabric (EDF)," GemFire EDF Technical White Paper, Copyright 2005 by GemStone Systems, Inc., 15 pages.

"GemFire Enterprise," GemFire Enterprise Technical White Paper, Copyright 2007 by GemStone Systems, Inc., 26 pages.

* cited by examiner

100
START
102
SELECT DATA
104
TRANSMIT STATE MARKER MESSAGE
106
RECEIVE STATE MARKER MESSAGE
108
IDENTIFY CHANNELS
110
TRANSMIT DATA - NEW OPERATIONS
112
CHANNEL N+1 STABILIZED ?
122
CONTINUE
OLD OPERATIONS COMPLETE ?
114
no
yes
TRANSMISSIONS CHANNEL N
116
RECEPTIONS CHANNEL N
118
CHANNEL N STABILIZED ?
120
no
yes
DATA STABILIZED ?
124
WAIT
REPLICATE DATA
126
UPDATE DATA
128
END
STORE DATA - NEW OPERATIONS
113

DATA REPLICATION METHOD

CROSS-REFERENCE TO RELATED APPLICATIONS

Not applicable.

BACKGROUND OF THE INVENTION

The present invention relates to distributed computing systems and, more particularly, to a method of replicating data managed by a data fabric communication network that interconnects the nodes of a distributed computer system.

A data fabric is a communication network that interconnects a plurality of distributed computation nodes of a computer system. The distributed computing nodes may be performing a plurality of processes and the data fabric enables the nodes to exchange data and use the data in the performance of the process(es) executing on the local node. The data fabric provides a data infrastructure that distributes and replicates data enabling data to be stored in a distributed memory so that the data may utilized at high rates with low latency and to be frequently updated by a plurality of processes being executed by one or more of the distributed computing nodes of the system.

Distributed data caching is a central feature of a data fabric network, such as GemFire Enterprise® data fabric from Gemstone Systems Inc. A cache provides temporary storage for data obtained from a data source enabling subsequent local use of the data without the necessity of repeatedly downloading the data from the data source. For example, a data cache may be used to temporarily store, at a local computer, data that is downloaded from an Internet web site. Latency in the use of the data is substantially reduced by the using the data in the local cache rather than downloading the data from a remote source for each use. The replication of data also provides redundant data storage for the system. If a process holding a replica of data fails, the data can be made available from other replicas held by other processes of the system. The GemFire Enterprise data fabric provides data management enabling creation of a plurality of local data caches consistent with the other data sources of the system and the updating of a plurality of replicas of the data to reflect the changes resulting from the use of the data by the nodes of a distributed system.

The GemFire Enterprise data fabric comprises processes to enable data consistency among the various replicas held by the system when a new replica of a data region, a portion of the system's data, is created. Messages communicating changes in the data of a data region are addressed to the various processes of the system holding a replica of the effected data region. When a new replica of the data is to be created, the GemFire Enterprise data fabric notifies the various processes utilizing the data to be replicated of the intention to create a new replica of the data region by copying one of replicas of the data region held by one of the system's processes and directs the processes to forward any new changes to the data to a new group of processes that includes the process in which the new replica is to be created. The process in which the new replica is to be created stores any changes to the data that are received and following creation of the new replica the data of the new replica is updated for any stored changes to the data. All of the processes utilizing the data of the replicated data region capture the changes to the data that were made after the intention to create the new replica is announced to the processes executing on the computing system. However, a change in the data that was made by a process prior to receipt of the notice of intention to create a new replica and which was transmitted to the existing replicas, but not received by the replica to be copied before the data is replicated may not be captured. The possibility that "in-flight" changes to the data may not be captured jeopardizes data consistency for the distributed system.

What is desired, therefore, is a method of replicating data that ensures that the changes to the data that are transmitted before replication will be incorporated in the replicated data.

DETAILED DESCRIPTION OF PREFERRED EMBODIMENTS

Figure 1:
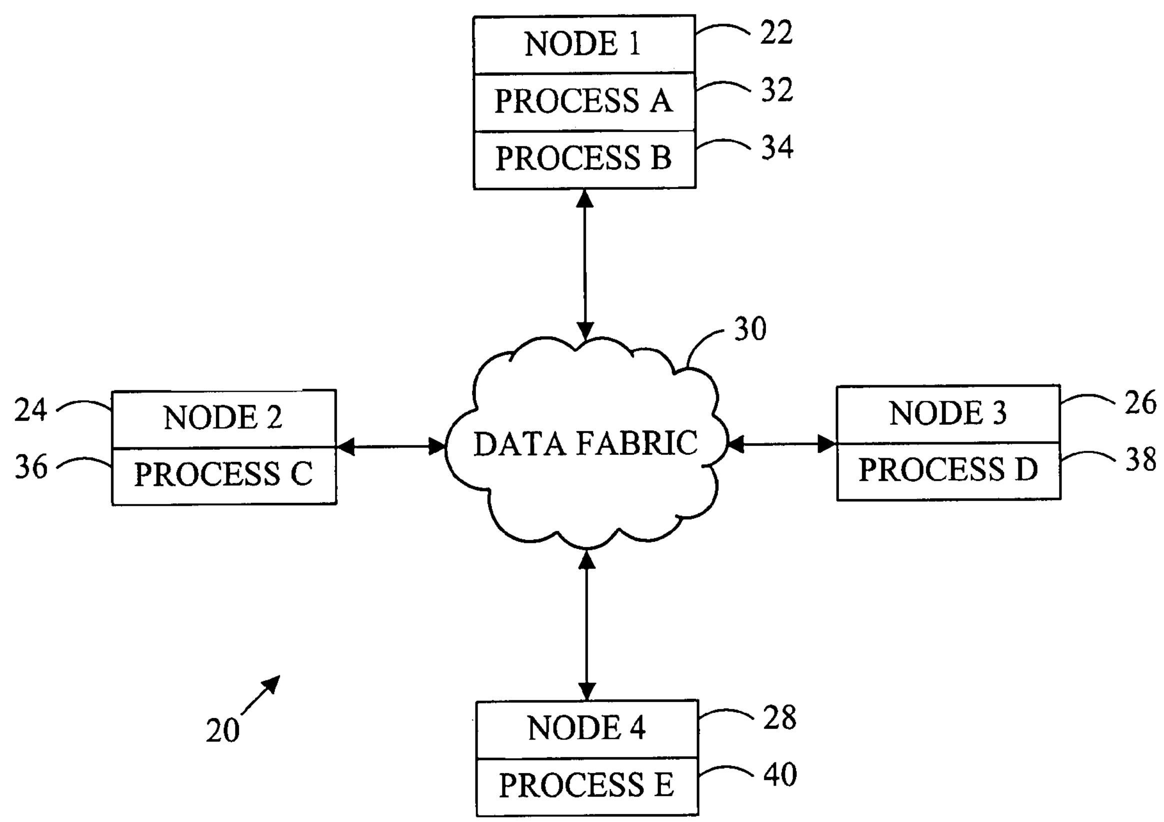
FIG. 1 is a block illustration of a distributed computing system.

Referring in detail to the drawings where similar parts are identified by like reference numerals, and, more particularly to FIG. 1, an exemplary distributed computing system 20 includes a plurality of computing nodes 22, 24, 26, 28 that are communicatively interconnected by a data fabric 30. The type of software executing on the nodes and the type of hardware that implements each node depends upon the application and may vary. For example, the nodes may be personal computers connected to a server presenting data for a website or the nodes may be a number of processors operating in parallel in a computer. Each node of the computing system may be executing one or more programs or processes 32, 34, 36, 38, 40 and some of the processes may utilize data which is held by one or more other processes and may, as a result of execution of the process, alter the values of the data held by the other process(es). The data fabric provides an operational data infrastructure that distributes and replicates data to enable storage of the data across a memory that may distributed among a plurality of the nodes. Distributed storage and replication of data enables processes to rapidly access the data from a local cache reducing the latency of the computing system and provides redundancy enabling the computing system to continue to access the data even if a process holding the data fails.

Figure 2:
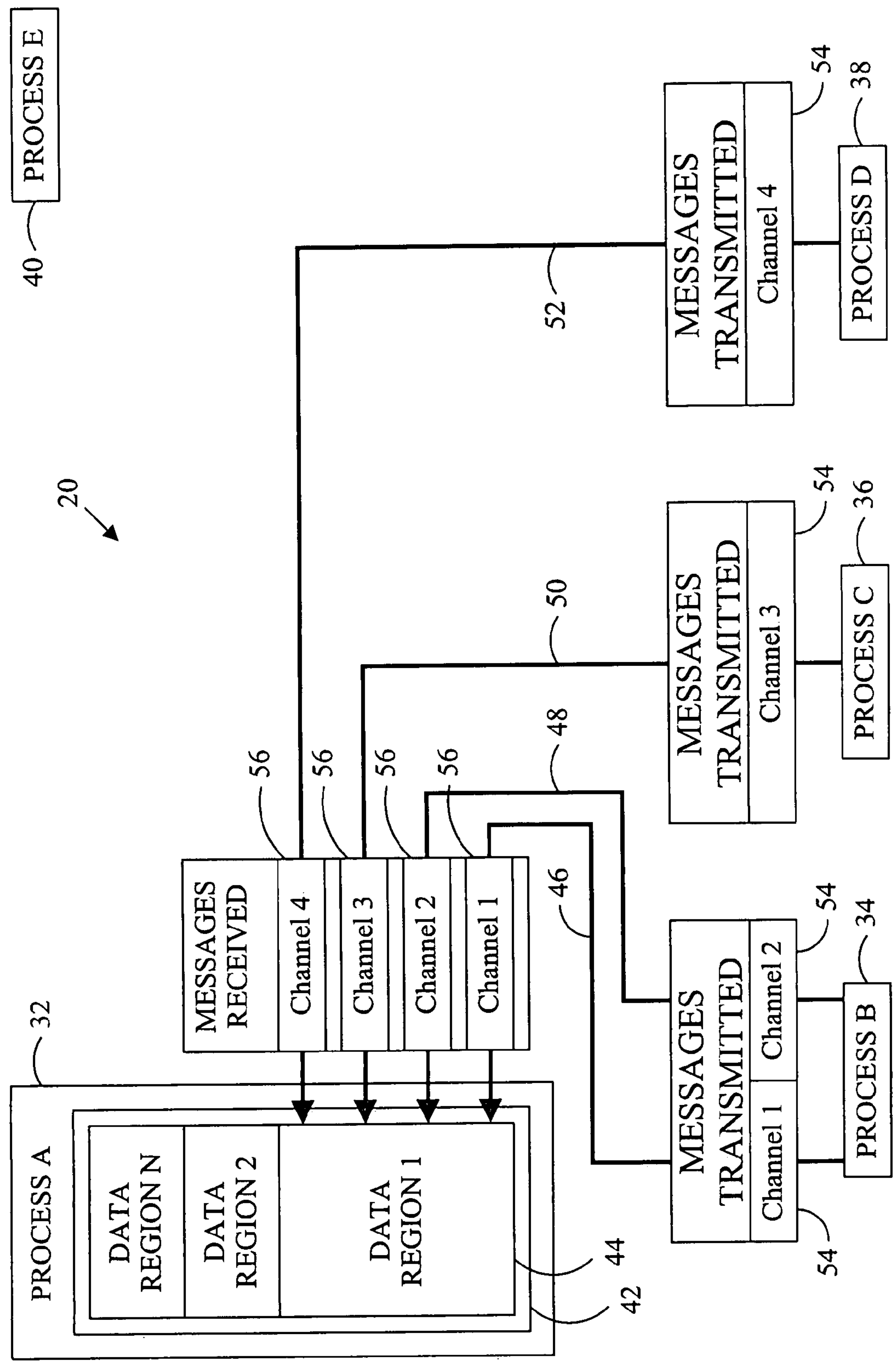
FIG. 2 is a block illustration of a plurality of processes utilizing data from a source.

Referring to FIG. 2, in a second representation of the exemplary distributed computing system 20 a process A 32 executing on the system holds a plurality of data 42. The data may be divided into a plurality of data regions, such as data region 144. Typically, the data regions comprise a plurality of like or related data. Five processes, process A, process B 34, process C 36, process D 38 and process E 40 are being executed on the exemplary system. All of the processes are using the data of data region 1 and, typically, holding replicas of the region's data.

When one of the processes B-D, alters a datum of data region 1, the change is transmitted to the group of processes using the datum or holding replicas of data region 1. The change is transmitted to process A over one of a plurality of communication channels, channel 1 (46), channel 2 (48), channel 3 (50) and channel 4 (52), that connect data region 1 to the respective processes that utilize the regions' data. If process B changes the data of data region 1, a message with the new value of the data is transmitted to the data region over either communication channel 1 or communication channel 2. Similarly, a change to data region 1 produced by process C is transmitted to data region 1 over communication channel 3 and a change to the data region by process D is transmitted over communication channel 4. At anytime, processes B, C, or D may be executing an operation that alters data region 1 and one or more messages reflecting change(s) in the data may be in transit to the data region on one of the communication channels that interconnects the processes and data region 1.

The message traffic of each of the communication channels of the computing system 20 is monitored by the computing system. A transmission monitor 54 monitors message transmissions on each communication channel and a reception monitor 56 tracks the receipt of messages for each channel. The monitors may comprise counters that log the number of messages transmitted and received or may comprise another device that tracks another metric that indicates that a message received by the data region from a communication channel is as current as the messages transmitted over the channel.

Figure 3:
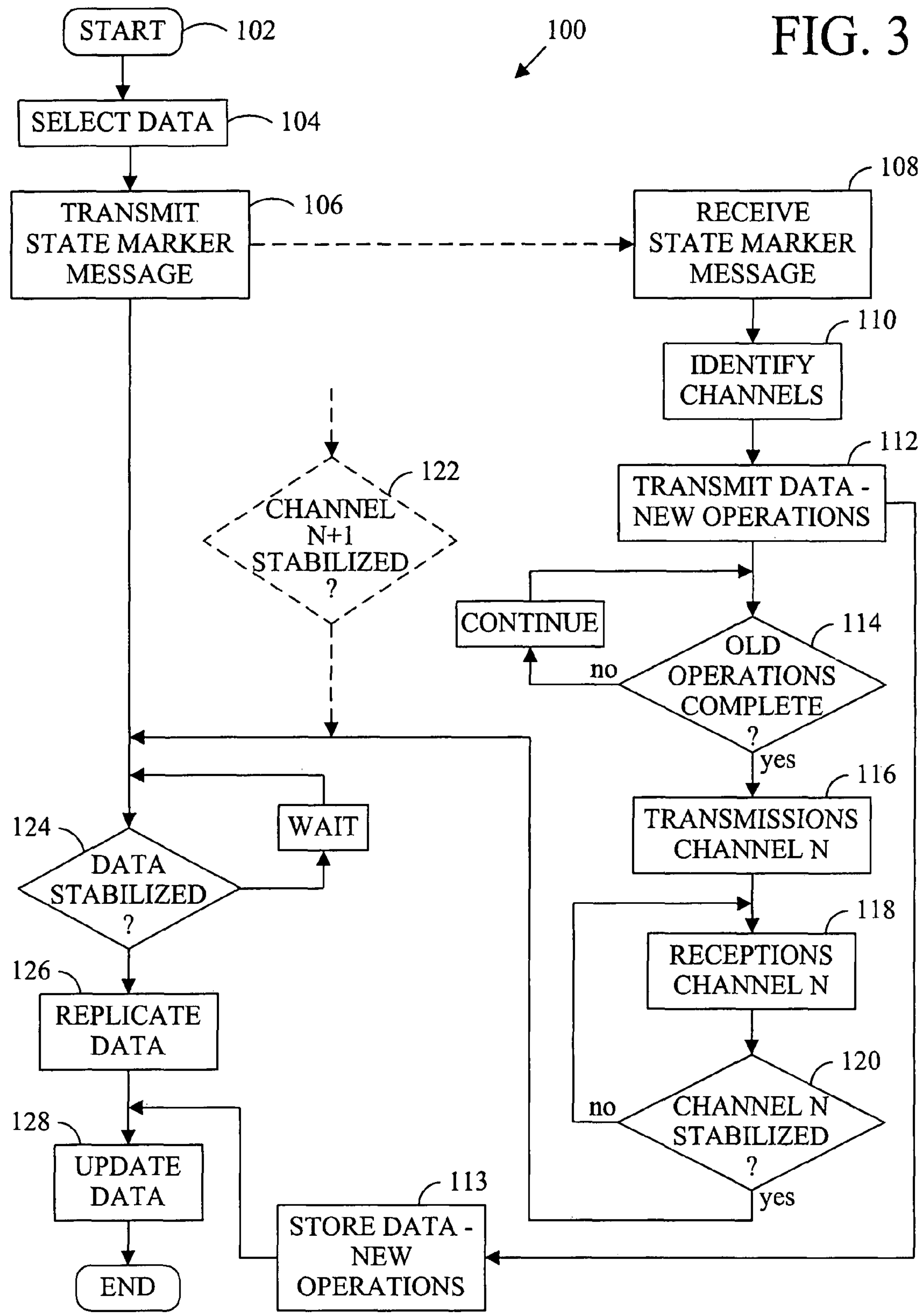
FIG. 3 is a flow diagram of a method of replicating data.

To provide redundant data storage, a local data cache to reduce latency, or to suit another purpose, it is desired that the data of data region 1 be replicated in process E 40. Referring to FIG. 3, the process of data replication 100 is initiated 102 when data region 1 is selected for replication 104 in, for example, Process E. The intention to replicate the data region is announced to the processes executing on the system by the transmission of a state marker message 106 to each of the processes using or holding the data. When the state marker message is received 108, each process identifies the communication channel(s) 110 that connects it to the replica of data region 1 in Process A. The processes utilizing or holding replicas of data region 1 are directed to communicate all changes in the data of data region 1, resulting from operations undertaken subsequent to the receipt of the notice of intent to replicate, to a new group of recipients that includes the process in which the new replica will be created 112, Process E. The process in which the new replica will be created, Process E, stores the changes to the data resulting from the "new operations" 113. Operations undertaken before receipt of the state marker message are completed 114 and any changes to data region 1 are transmitted to all the existing replicas of data region 1, including the replica held by Process A which is to be copied.

With the completion of operations undertaken before receipt of the state marker message, the state of each communication channel is determined. The status of the transmission monitor for each communication channel connected to the replica of the data to be copied is determined 116. For example, the number of messages transmitted to the existing group of users or holders of existing replicas of the data region is determined. Likewise, the status of reception monitor is determined 118. If messages directed to the group of processes using or holding a replica of data region 1 have been transmitted over the channel 120 but have not been received by data region 1, the system continues monitoring the communication channel. If all of the messages that have been transmitted over the communication channel to existing holders or users of the data have been received 120, the communication channel is stabilized. The data of the replica of data region 1 held by Process A has stabilized 124 and when all of the communication channels 122 connected to Process A's replica of data region 1 have stabilized. Alternatively, when all of the communication channels connecting a process and Process A's replica of data region 1 have stabilized then the data of the replica has stabilized as to the respective process. Process E may be notified that the data to be replicated has stabilized 124 with respect to a process when all of the communication channels connecting the process and the replica of the data have stabilized or when all communication channels communicating changes to the replica to be copied have stabilized.

When the data of Process A's replica of data region 1 has stabilized with respect to all processes 124, that is, when all of the messages addressed to existing holders and users of the data to be copied and transmitted to the replica of data region 1 held by Process A over all of the communication channels connecting the system's processes to the replica of data region 1 have been received, the data region is replicated 126 in Process E. When replication is complete, the new replica in Process E, is updated 128 from the stored "new operations" data completing the replication process. The results of any subsequent operation on the data is communicated to all replicas of the data, including the replica held by Process E.

The data replication process ensures data consistency by monitoring the communication channel(s) communicating changes to the data that is to be replicated to determine if changes are "in flight" from one or more processes. "In flight" changes are incorporated in the data to be replicated to prevent newer data from being overwritten by older data that is contained in the data region that is being copied.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of replicating a datum in a first process executed by a computing system, said datum held by a second process and alterable by a message received over one of a first communication channel and a second communication channel, said method comprising the steps of:

(a) determining a currency of a message transmitted over said first communication channel;

(b) determining a currency of a message received from said first communication channel, said message originating from a process other than said second process;

(c) determining a currency of a message transmitted over said second communication channel;

(d) determining a currency of a message received from said second communication channel, said message originating from a process other than said second process; and (e) enabling replication of said datum in said first process when said message originating from a process other than said second process received from said first communication channel is at least as current as said message transmitted over said first communication channel and said message originating from a process other than said second process received from said second communication channel is at least as current as said message transmitted over said second communication channel, wherein said enabling further comprises the steps of (i) comparing a number of messages transmitted to said datum over said first communication channel to a number of messages received by said datum from said first communication channel, (ii) comparing a number of messages transmitted to said datum over said second communication channel to a number of messages received by said datum from said second communication channel, and (iii) enabling replication of said datum in said first process when said number of messages received from said first communication channel is at least equal to said number of messages transmitted over said first communication channel and said number of messages received from said second communication channel is at least equal to said number of messages transmitted over said second communication channel.

2. The method of replicating a datum of claim 1 wherein said first communication channel communicatively interconnects a third process and said datum and said second communication channel communicatively interconnects a fourth process and said datum.

3. The method of replicating a datum of claim 1 wherein said first communication channel and said second communication channel communicatively interconnect a third process and said datum.

4. The method of replicating a datum of claim 1 wherein a number of messages transmitted to said datum over one of said first and said second communication channels is a measure of said currency of said message.

5. The method of replicating a datum of claim 1 wherein a number of messages received by said datum from one of said first and said second communication channels is a measure of said currency of said message.

6. A method of replicating a datum in a first process executed by a computing system, said datum held by a second process and alterable by a message received by said datum, said method comprising the steps of:

(a) identifying a first communication channel enabling a message altering said datum to be communicated to said datum from a third process;

(b) determining a number of data altering messages transmitted to said datum from said third process over said first communication channel;

(c) determining a number of data altering messages received by said datum from third process on said first communication channel;

(d) comparing said number of said messages received from said first communication channel to said number of messages transmitted over said first communication channel;

(e) notifying said first process when all data altering messages originating from said third process and transmitted to said datum over said first communication channel have been received;

(f) identifying a second communication channel enabling a message altering said datum to be communicated to said datum;

(g) determining a number of messages received by said datum from said second communication channel;

(h) comparing said number of messages received from said second communication channel to said number of messages transmitted over said second communication channel;

(i) notifying said first process when all data altering messages transmitted to said datum over said second communication channel have been received; and (j) enabling replication of said datum in said first process when said first process is notified that all data altering messages originating from a process other than said second process transmitted to said datum have been received.

7. The method of replicating a datum of claim 6 further comprising the step of transmitting a data altering message to said datum and to said first process if said alteration is undertaken after receipt of a notice of intent to replicate said datum.

8. The method of replicating a datum of claim 6 wherein a data altering message originating with a third process is transmitted to said datum over one of said first and said second communication channels.

9. The method of replicating a datum of claim 8 further comprising the step of transmitting a data altering message to said datum and to said first process if said alteration is undertaken after receipt of a notice of intent to replicate said datum.

10. The method of replicating a datum of claim 6 wherein a data altering message originating with a third process is communicated to said datum over said first communication channel and a data altering message originating with a fourth process is communicated to said datum over said second communication channel.

11. The method of replicating a datum of claim 10 further comprising the step of transmitting a data altering message to said datum and to said first process if said alteration is undertaken by one of said third process and said fourth process after receipt of a notice of intent to replicate said datum.

* * * * *